United States Patent [19]

Phillips et al.

[11] Patent Number: 5,305,142
[45] Date of Patent: Apr. 19, 1994

[54] REPLACEMENT ASSEMBLY FOR AN IMAGE INTENSIFIER TUBE

[75] Inventors: Earle N. Phillips; Charles Naselli, both of Roanoke, Va.

[73] Assignee: ITT Corporation, New York, N.Y.

[21] Appl. No.: 847,185

[22] Filed: Mar. 6, 1992

[51] Int. Cl.⁵ .............. G02B 23/00; G02B 13/14; H01J 31/50
[52] U.S. Cl. .................. 359/435; 359/357; 359/362; 359/432; 250/214 VT
[58] Field of Search ............. 359/399–406, 359/407–410, 423, 424–429, 434, 435, 350–354, 362, 754–756, 771, 775–778, 781–782, 793, 795; 250/214 LA, 214 VT; 313/524–530

[56] References Cited

U.S. PATENT DOCUMENTS

| | | | |
|---|---|---|---|
| 3,803,407 | 4/1974 | Anderson | 250/214 VT |
| 4,721,375 | 1/1988 | Van Dulmen | 359/428 |
| 4,840,474 | 6/1989 | Heft et al. | 359/434 |
| 4,961,278 | 10/1990 | Johnson et al. | 250/214 VT |
| 5,029,963 | 7/1991 | Naselli et al. | 385/33 |
| 5,084,780 | 1/1992 | Phillips | 359/350 |

FOREIGN PATENT DOCUMENTS

| | | |
|---|---|---|
| WO8500433 | 1/1985 | PCT Int'l Appl. |
| WO8904008 | 5/1989 | PCT Int'l Appl. |
| 2144558A | 3/1985 | United Kingdom |
| 2195187A | 3/1988 | United Kingdom |

*Primary Examiner*—Bruce Y. Arnold
*Assistant Examiner*—Thong Nguyen
*Attorney, Agent, or Firm*—Arthur L. Plevy; Patrick M. Hogan

[57] ABSTRACT

The present invention is an image intensifier assembly that includes a Generation III image intensifier tube and an inverter lens arrangement, such that the present invention image intensifier assembly can be substituted for a Generation II image intensifier tube in a given application. The inverter lens arrangement is adjustably positionable relative to the Generation III image intensifier tube so the image relayed can be focused to optimize the resolution of the complete tube assembly.

17 Claims, 3 Drawing Sheets

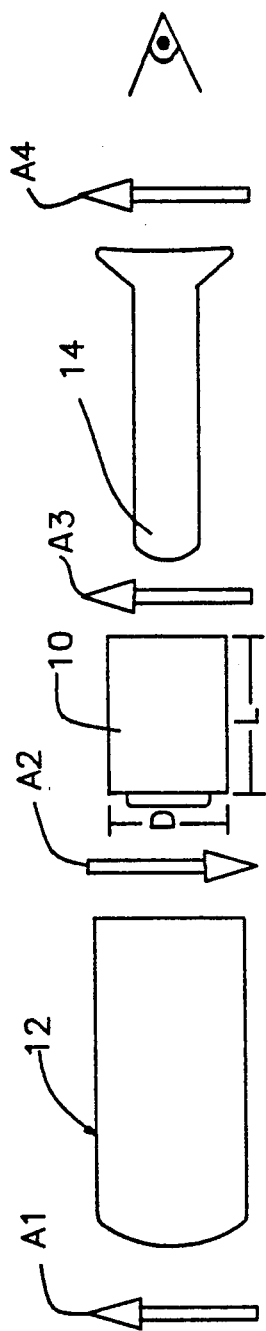
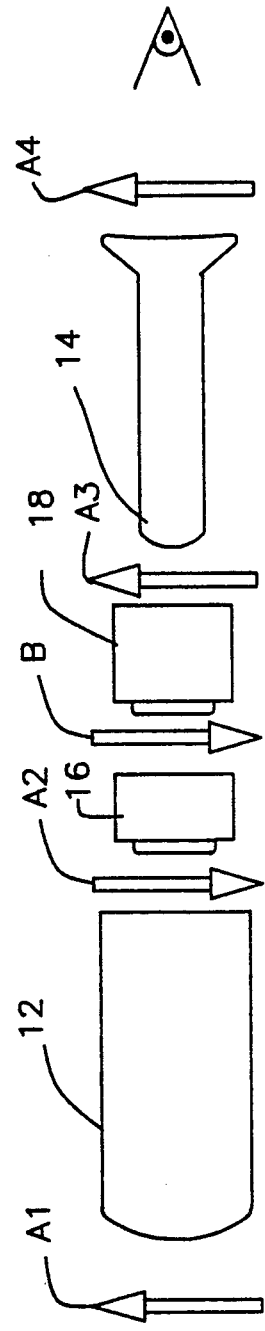
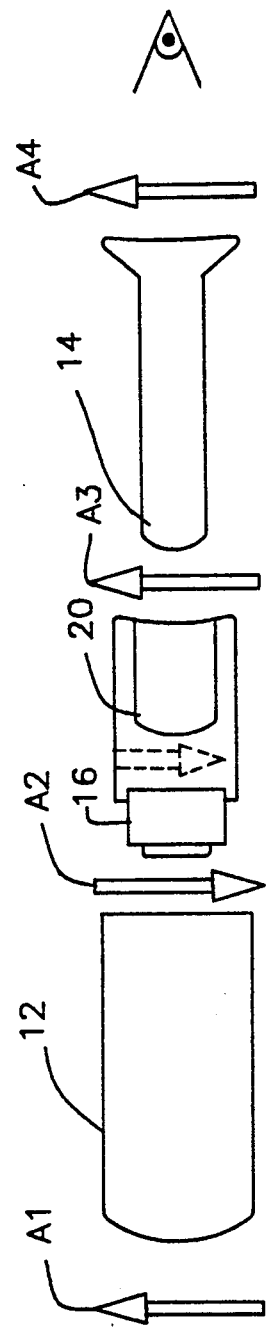
FIG. 1 (PRIOR ART)
FIG. 2 (PRIOR ART)
FIG. 3 (PRIOR ART)

REPLACEMENT ASSEMBLY FOR AN IMAGE INTENSIFIER TUBE

FIELD OF THE INVENTION

The present invention relates to a Generation III image intensifier assembly that can be substituted for the previously employed Generation II image intensifier used in a plurality of night vision devices.

BACKGROUND OF THE INVENTION

Image intensifier tubes are well known in the industry by their commonly used names, based on the generic generation from which their design came into being. The tubes have evolved from Generation 0 to the current Generation III. These tubes have typically been produced in both 18 mm and 25 mm diameter formats.

A significant portion of the military and commercial night vision equipment currently in use was designed to physically accommodate a 25 mm format Generation II (Gen II) image intensifier tube. The military equipment that uses the Gen II tube, includes Individual Served Weapon Sights, Crew Served Weapon Sights, night vision devices that facilitate the operation of motorcraft in low light conditions and for other applications as well.

The Gen II image intensifier tube conforms to very detailed U.S. military specifications and is identified by its U.S. military part number: MX-9644. The performance of the Gen II image intensifier tube is no longer the state of the art. The Gen II image intensifier tube is an inverter tube and exhibits a gain at $6 \times 10^{-6}$ foot candles input of from 20,000 to 70,000 with a typical gain of 50,000. The photocathode of a Gen II tube exhibits a luminous sensitivity of approximately 325 microamps per lumen at 2856° K. The Gen II image intensifier tube exhibits a signal-to-noise ratio of approximately 4:1 and a resolution of twenty eight line pairs per millimeter (lp/mm).

A higher performance image intensifier tube has been developed in the Generation III (Gen III) proximity focussed image intensifier tube. A Gen III image intensifier tube employs a gallium arsenide photocathode that has an improved photosensitivity that operates at starlight levels and below. A Gen III image intensifier device, with a glass output screen, exhibits a luminous gain in the range of 20,000 to 70,000 at $2.0 \times 10^{-6}$ foot candles. The sensitivity of the Gen III photocathode is over 1000 microamps per lumen at 2856° K., which is more than three times that of the Gen II tube. The signal-to-noise ratio has been increased to approximately 16:1. In addition, the resolution has been increased to 36–40 lp/mm.

Generation III (Gen III) is a generic term established by the United States Department of the Army at its Night Vision Labs at Fort Bellmore. The Gen III image intensifier tube is identified by Military Part Number MX-10160. The criteria set forth by the Department of the Army in distinguishing a Gen III tube from a MX-9644 Gen II tube is that a Gen III tube utilizes a gallium arsenide photocathode and an ion barrier film over the microchannel plate, while the Gen II tube does not. The form and function of the Gen III tube currently manufactured by ITT corp, the assignee herein, is described within U.S. patent application Ser. No. 08/020,650, filed Feb. 22, 1993 and entitled IMAGE INTENSIFIER TUBE. Furthermore, the structure and function of a Gen III image intensifier tube is available in the full military specification MX-10130.

In view of the above performance statistics it should be obvious that the Gen III image intensifier tube is more desirable than the Gen II image intensifier tube, and the Gen III tube should be substituted for the Gen II tube wherever possible. However, certain problems arise when such a substitution is attempted. As has been previously mentioned, many night vision applications were designed and built around the Gen II image intensifier tube. In such applications the size and shape of the night vision device was formed to enclose the MX-9644 Gen II tube. Additionally, the objective lens optics and the eyepiece optics were designed to complement the input and output of the Gen II tube.

In FIG. 1 there is shown a typical night vision application of the Gen II image intensifier tube 10. Positioned at the pupil of the Gen II image intensifier tube 10 is an objective lens assembly 12. Positioned at the rear of the Gen II image intensifier tube 10 is an eyepiece lens assembly 14. The shown optical assembly can represent any night vision application that utilizes the MX-9644 Gen II image intensifier tube. In operation, the objective lens assembly 12 is directed at a target object A1. The objective lens assembly 12 presents an inverted image A2 to the pupil of the Gen II image intensifier tube 10. In turn, the Gen II image intensifier tube inverts the image A2 to form an upright visible image A3 to the pupil of the eyepiece lens assembly 14. Finally, the eyepiece lens assembly 14 presents an upright image A4 to the eye of the observer.

When retrofitting a Generation III image intensifier tube into a Generation II application, two problems occur. First is the size differential. A Gen II image intensifier tube has a length L of approximately 77 mm and has a nominal diameter D of approximately 62 mm. A Gen III image intensifier tube has a length of 16.4 mm and also embodies a smaller nominal diameter. Such a size differential obviously affects the focal positions of the objective lens assembly 12 and the eyepiece lens assembly 14, since both can no longer be properly focussed in relation to the undersized Gen III tube.

The second problem that occurs when retrofitting a Gen III tube into a Gen II tube application, is that the MX-9644 Gen II image intensifier tube inverts the image, whereas the 25 mm format Gen III image intensifier tubes typically do not. Consequently, if a Gen III tube is directly substituted for a Gen II tube, the image viewed by an observer would be inverted.

To solve the above problems of retrofitting a Gen III image intensifier tube into a Gen II tube application, two approaches have been tried. Referring to FIG. 2 the first approach is illustrated. In this prior art embodiment, a Gen III image intensifier tube 16 and a Generation I (Gen I) image intensifier tube 18 are placed in series. The attachment of the Gen I tube 18 to the Gen III tube 16 gives the combined assembly approximately the same length as the MX-9644 Gen II image intensifier tube. As such, the pupil of the Gen III tube is properly distanced from the objective lens assembly 12 and pupil of the eyepiece lens assembly 14 is properly distanced from the output screen of the Gen I tube 18. The problem of inversion is also solved by the combined Gen III tube and Gen I tube assembly, since the Gen I tube 18 reinverts the inverted image B from the objective lens, which is passed through the Gen III tube 16 without inversion. As such, the Gen III and Gen I tube assembly provides the same upright image as would a lone Gen II image intensifier tube.

The combined Gen III and Gen I tube assembly does have disadvantages. The use of adjacent image intensifier tubes produces significant optical losses in the fiber optic plates added to the interface between the two tubes. Similarly, optical losses occur due to the limited MTF of the Gen I electron optics. Since two tubes are used, a more complicated power supply is needed to operate both tubes. Gen I tubes are expensive and becoming increasingly difficult to find because of their obsolescence in favor of the Gen II and Gen III image intensifier tubes. Additionally, by combining a Gen III tube with a Gen I tube, two vacuum envelopes are now included in one application. A consequence of two vacuum envelopes is a shorter mean time between failure (MTBF) and the added expense of repair and maintenance.

The second approach used to retrofit Gen III image intensifier tubes into a specific Gen II tube application is set forth in U.S. Pat. No. 5,029,963 entitled "REPLACEMENT DEVICE FOR A DRIVER'S VIEWER" to Naselli et al and assigned to ITT Corporation, the assignee herein. The approach of the Naselli patent is illustrated in FIG. 3. Referring to FIG. 3 it can be seen that the Naselli patent uses a Gen III image intensifier tube 16 coupled with an inverter lens assembly 20. The inverter lens assembly 20 reinverts the inverted image A2 from the objective lens passing through the Gen III tube producing the inverted image A3 needed at the pupil of the eyepiece lens assembly 14. The inverter lens assembly 20 is arranged so as to compensate for the undersized shape of the Gen III tube and to provide a properly oriented and focussed image to the eyepiece lens assembly 14. In this application, the relay lens magnifies the image format from 25 mm to 46 mm diameter and presents the image to the eyepiece.

As has been previously mentioned, the MX-9644 Gen II image intensifier tube has been the tube of choice in many night vision applications. Those applications include, but are not limited to, Model AN/PVS-4 Individual Served Weapon Sight, the Model AN/TVS-5 Crew Served Weapon Sight, the Model M-36 Night Vision Elbow for tanks, the Model AN/VVS-2 Drivers Viewer and various commercial night vision systems. Although all the above systems are similar in their function, they do not employ identical optics. As such, the unadjustable optics of a single form of the referenced prior art cannot be retrofitted into the variety of existing applications. The reference prior art retrofitting techniques must be custom made for each and every application. For example, the above-noted Naselli patent discloses a retrofit system for the Model AN/VVS-2 Driver Viewer and discloses an optical arrangement specifically dedicated to that system. Additionally, U.S. patent application Ser. No. 07/785,048, to Phillips, filed Oct. 30, 1991 and entitled "TELESCOPIC SIGHT FOR DAY/NIGHT VIEWING" discloses a dedicated optical system that employs a Gen III image intensifier tube in an Individual Served Weapon Sight. These applications are custom made for a specific device and cannot be exchanged into other devices.

It is therefore a primary objective of this invention to provide an image intensifier system that includes a Gen III image intensifier tube that can be retrofitted into a specific MX-9644 Gen II image intensifier tube application.

SUMMARY OF THE INVENTION

The present invention is an image intensifier assembly that includes a 25 mm format Generation III image intensifier tube. The image intensifier assembly also includes a non-magnifying inverter lens arrangement for inverting the image produced by the Gen III image intensifier tube so that the present invention image intensifier assembly can be retrofitted into existing type MX-9644 Generation II image intensifier tube applications.

The Gen III image intensifier tube, along with the inverter lens arrangement, are held within a sub-assembly housing that can be substituted in place and instead of a type MX-9644 Gen II image intensifier tube. The present invention image intensifier assembly may be formed to be substantially the same dimensions as the Gen II image intensifier tube or can be formed to have a greater overall length. In certain devices where the present invention image intensifier assembly is longer than the Gen II image intensifier tube it is replacing, an extension means may be added to the device, extending its length to correspond, and accommodate, the length of the new image intensifier assembly.

The inverter lens arrangement provides no optical power (magnification or reduction) to the overall system. Additionally, the inverter lens arrangement is adjustably positionable within the sub-assembly housing so its position relative to the Gen III image intensifier tube may be changed. The adjustability of position allows the image, relayed and inverted by the inverter lens arrangement, to be focused to optimize the clarity of the image when viewed.

BRIEF DESCRIPTION OF THE FIGURES

For a better understanding of the present invention, reference may be had to the following description of an exemplary embodiment thereof, considered in conjunction with the accompanying drawings, in which:

FIG. 1 shows a prior art schematic of the optical components of a night vision device utilizing a Generation II image intensifier tube;

FIG. 2 shows a prior art schematic of the night vision device of FIG. 1 wherein the Generation II image intensifier tube is replaced with a combination Generation III/Generation I image intensifier tubes;

FIG. 3 shows a prior art schematic of the night vision device of FIG. 1 wherein the Generation II image intensifier tube is replaced with an inverter lens assembly that includes a Generation III image intensifier tube;

DETAILED DESCRIPTION OF THE DRAWINGS

Figure 4:
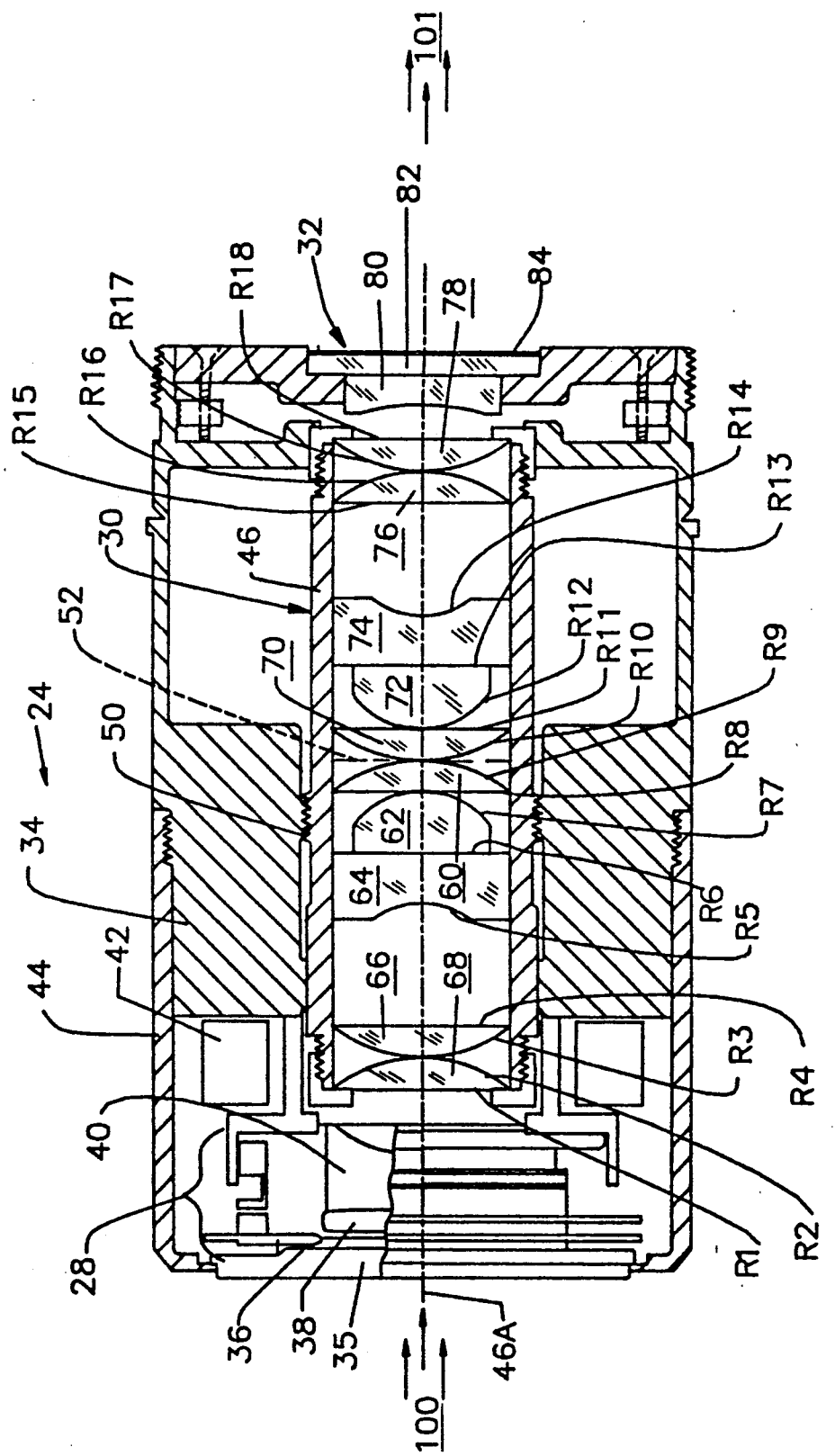
FIG. 4 is a selectively sectioned side view of one embodiment of the present invention image intensifier assembly.

Referring to FIG. 4 the present invention image intensifier assembly 24 is shown. The image intensifier assembly 24 is comprised of a Generation III image intensifier tube 28, an adjustable inverter lens arrangement 30 and an exit lens arrangement 32, all held within a main housing 34. The main housing 34 has two opposed open ends, a light input end 100 and light output end 101.

The Gen III image intensifier tube 28 is positioned at the pupil of the relay lens assembly 30. The form and function of the Gen III image intensifier tube 28 is well known in the art and includes a gallium arsenide photocathode 35, a microchannel plate 36 and an output plate or window 38. In the shown embodiment, the output window is formed of clear glass; however, a fiber optic window could be used in an alternate embodiment. Associated with, and bonded to, the output window 38 of the Gen III image intensifier tube 28, is a field flattener lens 40. The field flattener lens 40 corrects spherical aberrations for the image produced on the output plate 38. The lens 40 is depicted as a plano-concave lens but other configurations can be employed. The lens eliminates reflections and ghost images caused by parallel glass surfaces. This type of output window is described in U.S. Pat. No. 5,023,511 issued on Jun. 11, 1991 to E. N. Phillips entitled "OPTICAL ELEMENT OUTPUT FOR AN IMAGE INTENSIFIER DEVICE, and assigned to the assignee herein. As seen, a tube member 44 has threads formed on its inner diameter, for engaging the threads on the outer periphery of the main housing 34 for securing the tube member 44 to the main housing 34. The Gen III image intensifier tube 28 is powered by a power supply 42 and both the power supply 42 and the Gen III image intensifier tube 28 are potted in place, in the tube member 44. Power for the assembly is provided from the night vision system housing through external pins on the tube member 44. Input voltage is 2.0 to 3.0 Vdc.

The Gen III image intensifier tube 28 is positioned such that the optical axis of the Gen III tube 28 is directly aligned with the optical axis of the inverter lens arrangement 30. The inverter lens arrangement 30 is comprised of an open-ended lens barrel or cylinder 46 in which are placed a plurality of optical lens elements.

Each of the lens elements share a common optical axis aligned on the same axis line as the longitudinal axis 46A of the barrel 46. Disposed on the outer circumferential surface of the lens barrel 46 are threads 50. The threads 50 intermesh with sympathetically formed threads on the housing 34, such that the position of the cylinder or barrel 46 within the main housing 34 can be adjusted by rotating the lens barrel 46 relative to the main housing 34. By rotating the lens barrel 46, the entire inverter lens arrangement 30 can be moved back and forth between the Gen III image intensifier tube 28 and the exit lens arrangement 32.

The lens elements within the cylinder 46 may be symmetrically formed and distributed on either side of a centered dividing line 52 (dashed) in the center of the cylinder 46. The lens elements are formed as a mirror image to each other on either side of the dividing line 52. The symmetric distribution of the lens elements assures that the input image will receive no magnification or reduction as it passes through, and that the input image is inverted by the lens elements. In the embodiment shown by FIG. 4 there are ten lens elements within the cylinder 46; five identical lens elements on either side of the central dividing line 52. The ten lens elements are identified by reference numbers 60, 62, 64, 68, 70, 72, 74, and 78, and are numbered so the lenses represented by the sixty series of numbers (60, 62, 64, 66, and 68) correspond to a mirror image lens in the seventy series of numbers (70, 72, 74, 76, and 78). For example, lens element 60 is formed to be the mirror image of lens element 70, lens element 62 is formed to be the mirror image of lens element 72, etc.

Referring to the below table the actual composition, shape and arrangement of the ten lens elements in the cylinder 46 are detailed; wherein:

| SURFACE | RADIUS OF CURVATURE (mm) | SPACE BETWEEN SURFACES ON OPTICAL AXIS (mm) | GLASS TYPE |
| --- | --- | --- | --- |
| R1 | 219.900 | | |
| | | 4.000 | LASF08-OHARA |
| R2 | 36.308 | | |
| | | 0.200 | |
| R3 | −36.308 | | |
| | | 4.000 | LASF08-OHARA |
| R4 | −219.900 | | |
| | | 13.951 | |
| R5 | 14.260 | | |
| | | 5.230 | SFL03-OHARA |
| R6 | −219.900 | | |
| | | 7.260 | LLFG-SCHOTT |
| R7 | 17.010 | | |
| | | 0.200 | |
| R8 | 219.900 | | |
| | | 4.000 | LASF08-OHARA |
| R9 | 36.308 | | |
| | | 0.100 | |
| Center Dividing Line 52 | | | |
| | | 0.100 | |
| R10 | 36.308 | | |
| | | 4.000 | LASF08-OHARA |
| R11 | −219.900 | | |
| | | 0.200 | |
| R12 | −17.010 | | |
| | | 7.260 | LLFG-SCHOTT |
| R13 | 219.900 | | |
| | | 5.230 | SFL03-OHARA |
| R14 | −14.260 | | |
| | | 13.951 | |
| R15 | 219.900 | | |
| | | 4.000 | LASF08-OHARA |
| R16 | 36.308 | | |
| | | 0.200 | |

| SURFACE | RADIUS OF CURVATURE (mm) | SPACE BETWEEN SURFACES ON OPTICAL AXIS (mm) | GLASS TYPE |
| --- | --- | --- | --- |
| R17 | −36.308 | 4.000 | LASF08-OHARA |
| R18 | −219.900 | | |

It should now appear obvious that, for the shown embodiment, all the lens elements 60, 62, 64, 66, 68, and 70, 72, 74, 76, 78 are symmetrically arranged in shape, location and material on either side of the center dividing line 52. As such, it should appear obvious to a person skilled in the art that any magnification or reduction caused by the lens elements on one side of the dividing line 52 would be corrected for by the lens elements on the opposing side of the center line. This assures the image produced by the Gen III image intensifier tube is relayed to the exit lens arrangement 32 without a change in optical power. It will be recognized by a person skilled in the art that alternative embodiments of the present invention can be constructed with lens elements that are not evenly disposed on either side of a dividing line, and wherein such lens elements provide magnification or reduction to the viewed image.

The exit lens assembly 32 is affixed to the housing 34 opposite the Gen III image intensifier tube 28. The exit lens assembly 32 is comprised of a glass plate 82 and a plano-concave lens 80 that are identical to, but mirror images of, the output plate 38 and field flattener lens 40 that are formed as part of the Gen III image intensifier tube 28. By constructing the exit lens assembly 32 in such a manner, the correction created by the field flattener lens 40 on the image of the output plate 38 is removed, and the image produced on the glass plate 82 is the identical inverted image of what appears on the output plate 38 of the Gen III image intensifier tube 28. For certain applications, a reticle image 84 may be etched into the external surface of glass plate 82, coincident with the image produced by the inverter lens 30.

Although the present invention image intensifier tube can be used to replace any type MX-9644 Generation II image intensifier tube, the function of the present invention will be detailed in relation to a Model AN/PVS-4 Individual Served Weapon Sight.

Figure 5:
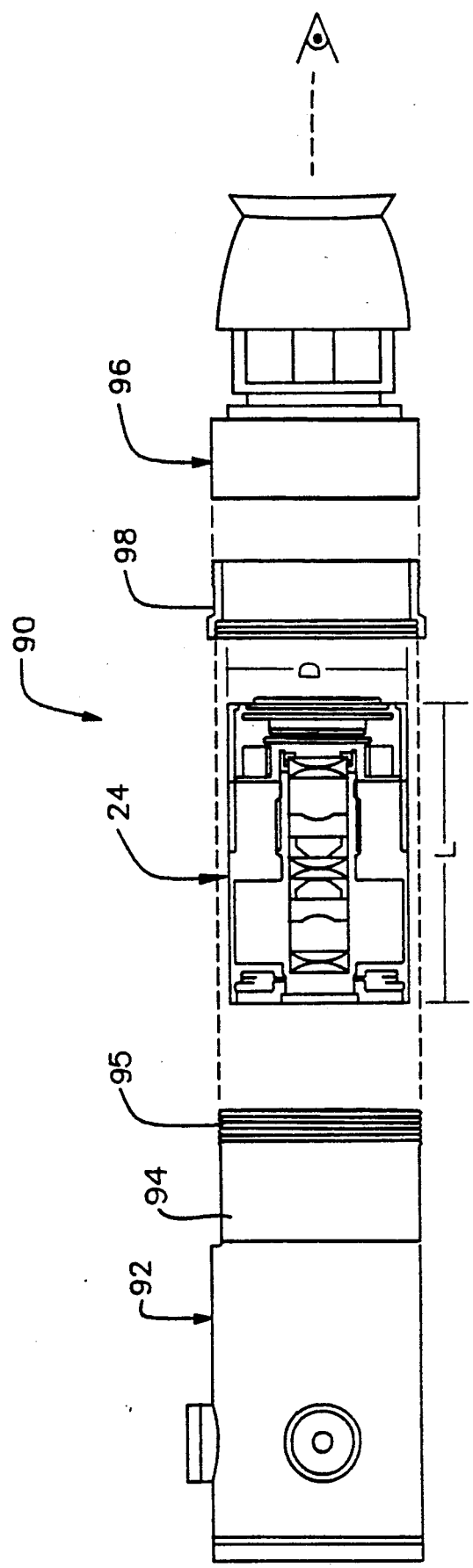
FIG. 5 is a selectively sectioned side view of one preferred embodiment of the present invention shown in conjunction with a Model AN/PVS-4 Individual Served Weapon Sight.

Referring to FIG. 5, there is shown an exploded view of the Model AN/PVS-4 Individual Served Weapon Sight 90 wherein the Gen II image intensifier tube has been replaced by the present invention image intensifier assembly 24. The Model AN/PVS-4 individual served weapon sight 90 has a large objective lens assembly 92 which is attached to a battery housing 94. If a Gen II image intensifier tube were being used, the threads 95 formed on the battery housing 94, would screw directly into the eyepiece assembly 96. When connected, a cavity is formed between the objective lens assembly 92 and the eyepiece assembly 96 in which the Gen II image intensifier tube would be held. The cavity would normally be approximately 77 mm long and have a diameter of 63 mm in order to match the nominal dimensions of the Gen II image intensifier tube.

However, the shown embodiment of the present invention image intensifier assembly 24 has a length L of approximately 105 mm, which is 28 mm longer than the Gen II image intensifier tube. Obviously, the present invention image intensifier assembly 24 cannot be directly substituted in place of the Gen II tube. The present invention image intensifier assembly 24 has a diameter D of approximately 63 mm, which is comparable to the Gen II image intensifier tube. As such, the image intensifier assembly 24 fits into the existing cavity but overextends its length. In order to retrofit the image intensifier assembly 24 into the model AN/PVS-4 Individual Served Weapon sight 90, an extension housing ring 98 must be added. The extension housing ring 98 threads onto the distal end of the battery housing 94 of the objective lens assembly 92, and threads into the eyepiece lens assembly 96, thus adding the needed length to the overall housing. With the extension housing ring 98 in place, the resulting cavity is shaped to fit the image intensifier assembly 24, and the need for the old Gen II image intensifier tube is removed.

Since the shown embodiment of the image intensifier assembly 24 is longer than the Gen II image intensifier tube, its ability to replace the Gen II tube is limited to applications where housing extensions can be added. However, the lens elements of the image intensifier assembly 24 represent only one preferred embodiment and shorter assemblies can be constructed by a person skilled in the art.

Since the present invention image intensifier assembly 24 can be added to many different night vision applications, some requiring housing extensions, it should appear obvious to a person skilled in the art that small discrepancies may appear in the dimensions, from one application to the next. As has been previously described, the image intensifier assembly 24 includes an inverter lens arrangement 30 that is adjustably positionable between the Gen III image intensifier tube 28 and the exit lens arrangement 32. By adjusting the position of the inverter lens arrangement 30, the overall optical performance of the image intensifier assembly can be focused to create the best image for the eyepiece lens assembly 96.

The present invention image intensifier assembly 24 utilizes the Gen III image intensifier tube 28 with an adjustably positionable inverter lens assembly 30. It should be understood that although only one embodiment of the inverter lens arrangement 30 was specifically described, any lens combination and arrangement can be used as long as the lens arrangement inverts the image from the Gen III tube, and does so in a manner that produces substantially no optical power. A person skilled in the art may produce many variations on the inverter lens arrangement 30, thus producing an inverter lens arrangement of many different lengths. Since the inverter lens arrangement 30 can be varied in length, the overall length of the image intensifier assembly 24 may be varied. The length of the present invention image intensifier assembly 24 can therefore be custom designed to match substantially any Gen II image intensifier tube application. In applications, such as the Model AN/PVS-4 Individual Served Weapon Sight of FIG. 4, it may be more practical to change the length of the night vision device to match a standard preferred length of the present invention image intensifier assembly 24.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

What is claimed is:

1. An image intensifier assembly comprising:
   a Generation III image intensifier tube located at one end of said assembly; and
   an invertor lens arrangement for inverting an image produced by said Generation III image intensifier tube, said invertor lens arrangement having substantially no optical power and being adjustably positionable, within said assembly, relative to said Generation III image intensifier tube.

2. The assembly of claim 1, wherein said Generation III image intensifier tube has an optical axis and said invertor lens arrangement has an optical axis, wherein said Generation III image intensifier tube and said invertor lens assembly are held within a housing means such that the optical axis of said image intensifier tube is substantially aligned with the optical axis of said invertor lens arrangement.

3. The assembly of claim 2, wherein said invertor lens arrangement includes a plurality of lens elements positioned within a lens barrel, said lens barrel having external threads that intermesh with said housing means, such that the rotation of said lens barrel relative to said housing varies the location of said lens barrel relative to said Generation III image intensifier tube.

4. The assembly of claim 1, wherein said invertor lens arrangement includes a plurality of lens elements disposed within a lens barrel along a common optical axis, wherein said lens elements are symmetrically arranged on either side of a dividing line within said lens barrel.

5. The assembly of claim 4, wherein said lens elements on either side of said dividing line include:
   a first converging concavo-convex lens having a convex surface adjacent to said dividing line;
   a doublet lens having a convex surface adjacent to said first converging concavo-convex lens;
   a second converging concavo-convex lens having a concave surface facing said doublet lens; and
   a third converging concavo-convex lens having a convex surface adjacent to said second converging concavo-convex lens.

6. The assembly of claim 5, wherein each of said first, second and third converging concavo-convex lenses has a radius of curvature of approximately 219.9 mm on a concave surface and a radius of curvature of approximately 36.308 mm on a convex surface, each said converging concavo-convex lens having a lens width of approximately 4 mm along the optical axis.

7. The assembly of claim 5, wherein said doublet lens includes a first lens element with a radius of curvature of approximately 14.26 mm on a concave surface, and a second lens element with a radius of curvature of approximately 17.01 mm on a convex surface, said first and second lens elements being joined along an interface surface with a radius of curvature of approximately 219 mm such that both said first and second lens elements are substantially concavo-convex, and wherein said first lens element has a width of approximately 5.23 mm and said second lens element has a width of approximately 7.26 mm along the optical axis.

8. The assembly of claim 7, wherein said dividing line is approximately 0.1 mm from said first converging concavo-convex lens along the optical axis, said doublet lens is approximately 0.2 mm from said first converging concavo-convex lens along the optical axis, said second converging concavo-convex lens is approximately 13.951 mm from said doublet lens along the optical axis and said third converging concavo-convex lens is approximately 0.2 mm from said second converging concavo-convex lens along the optical axis.

9. The assembly of claim 1, wherein an exit lens arrangement is positioned at one end of said assembly opposite said Generation III image intensifier tube, whereby said invertor lens arrangement is disposed between said Generation III image intensifier tube and said exit lens arrangement.

10. The assembly of claim 9, wherein a reticle image is etched onto said exit lens arrangement, said reticle image being superimposed over the image produced by said Generation III image intensifier tube when viewed through said exit lens arrangement.

11. The assembly of claim 9, wherein said Generation III image intensifier tube includes an optical field flattener that creates an optical distortion in the image produced by the Generation III image intensifier tube and said exit lens arrangement includes an optical element that corrects said optical distortion in the image.

12. In a night viewing device having an image intensifier assembly positioned between an objective lens assembly and an eyepiece assembly, an improved image intensifier assembly comprising:
    a Generation III image intensifier tube for creating an image from light received through said objective lens assembly; and
    an invertor lens arrangement for inverting said image created by said Generation III image intensifier tube, said invertor lens arrangement having substantially no power and being adjustably positionable relative to said Generation III image intensifier tube.

13. The assembly of claim 12, wherein said night viewing device is a model AN/PVS-4 Individual Served Weapon Sight.

14. In a viewing device having a Generation II image intensifier assembly positioned between an objective lens assembly and an eyepiece assembly within a main housing, a retrofit system for the Generation II image intensifier tube comprising:
    a Generation III image intensifier tube for creating an image from light received through said objective lens assembly; and
    an invertor lens arrangement for inverting said image prior to being viewed through said eyepiece assembly, wherein said invertor lens arrangement has substantially no optical power.

15. The retrofit system of claim 14, further including an exit lens arrangement, said Generation III image intensifier tube, said invertor lens arrangement and said exit lens arrangement being held within a sub-assembly housing sharing a common optical axis and said invertor lens arrangement being adjustably positionable between said Generation III image intensifier tube and said exit lens arrangement.

16. The retrofit system of claim 15, wherein said sub-assembly housing is longer than said Generation II image intensifier tube, said retrofit system further including a housing extension means for extending the length of said main housing to compensate for the longer length of said sub-assembly housing whereby said sub-assembly housing can be positioned within said main housing.

17. The retrofit system of claim 16, wherein said viewing device is a Model AN/PVS-4 Individual Served Weapon Sight.

* * * * *